(12) United States Patent
Conway (10) Patent No.: US 8,478,942 B2
(45) Date of Patent: Jul. 2, 2013

(54) METHOD AND APPARATUS FOR REDUCING PROCESSOR CACHE POLLUTION CAUSED BY AGGRESSIVE PREFETCHING

(75) Inventor: Patrick Conway, Los Altos, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 470 days.

(21) Appl. No.: 12/891,027

(22) Filed: Sep. 27, 2010

(65) Prior Publication Data
US 2012/0079205 A1  Mar. 29, 2012

(51) Int. Cl.
*G06F 12/00* (2006.01)
(52) U.S. Cl.
USPC ........... 711/133; 711/122; 711/135; 711/136; 711/144; 711/156; 711/159; 711/160
(58) Field of Classification Search
USPC ................. 711/133, 122, 135, 136, 144, 156, 711/159, 160
See application file for complete search history.

(56) References Cited

U.S. PATENT DOCUMENTS

| 6,578,111 | B1 | 6/2003 | Damron et al. ............... 711/133 |
| 6,965,969 | B2 * | 11/2005 | Burger et al. ................. 711/128 |
| 7,133,975 | B1 * | 11/2006 | Isaac et al. .................... 711/141 |
| 7,373,466 | B1 * | 5/2008 | Conway ......................... 711/156 |
| 8,041,897 | B2 * | 10/2011 | Biles et al. .................... 711/133 |
| 2006/0069876 | A1 * | 3/2006 | Bansal et al. ................. 711/134 |
| 2007/0094450 | A1 | 4/2007 | VanderWiel .................. 711/133 |
| 2008/0215820 | A1 * | 9/2008 | Conway ......................... 711/141 |

OTHER PUBLICATIONS

International PCT/US/2011/052680 Search Report dated Jan. 30, 2012.
Written Opinion dated Jan. 30, 2012.

* cited by examiner

*Primary Examiner* — Stephen Elmore
(74) *Attorney, Agent, or Firm* — Williams, Morgan & Amerson, P.C.

(57) ABSTRACT

A method and apparatus for controlling a first and second cache is provided. A cache entry is received in the first cache, and the entry is identified as having an untouched status. Thereafter, the status of the cache entry is updated to accessed in response to receiving a request for at least a portion of the cache entry, and the cache entry is subsequently cast out according to a preselected cache line replacement algorithm. The cast out cache entry is stored in the second cache according to the status of the cast out cache entry.

19 Claims, 6 Drawing Sheets

METHOD AND APPARATUS FOR REDUCING PROCESSOR CACHE POLLUTION CAUSED BY AGGRESSIVE PREFETCHING

CROSS-REFERENCE TO RELATED APPLICATIONS

Not applicable.

BACKGROUND

The disclosed subject matter relates generally to cache memory systems and, more particularly, to a multi-level cache memory system that reduces a performance hit associated with wasted cache prefetching.

Modern microprocessors are much faster than the memory in which the program is stored. That is, the microprocessor can execute instructions at a rate that is faster than the rate at which the instructions can be retrieved from memory, and thus, the program's instructions cannot be read fast enough to keep the microprocessor busy.

Prefetching the instructions before they are actually needed by the microprocessor is a useful mechanism to overcome the relatively slow response of memory and allow the processor to operate at its substantially higher speed. When the instruction is prefetched from memory, it is placed in a cache where it may be accessed very quickly when the processor is ready to execute that particular instruction.

One problem with prefetching is that software programs are not always executed in the order that they are stored. In fact, there are many instructions that cause the software program to branch or jump to another location in the program. Thus, accurately predicting when the program will branch or jump to another location can dramatically affect the quality of the prefetching, and consequently, the speed at which the processor can execute the software program. Many mechanisms have been proposed that supposedly enhance the predictions so as to allow more continuous, speedy operation of the processor. However, these predictors have at least one thing in common—they are at least occasionally wrong and instructions are prefetched that are not used by the processor. That is, prefetch algorithms may prove beneficial for some applications but ineffective on others. When prefetched code or data is not consistently and accurately accessed during the execution of the program, a prefetcher can actually hurt the performance of the processor.

A 'wasted' prefetch is a memory access that causes a cache to be filled with an anticipated instruction(s) but ages out of the cache before it is accessed. Wasted prefetches consume system and memory bandwidth and pollute the processor core's private caches and also shared Chip-Multi-Processor (CMP) caches.

Modern prefetchers can be very aggressive in that they prefetch code and data at high rates with a high proportion of wasted prefetches.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for controlling a first and second cache. The method comprises receiving a cache entry in the first cache, and identifying the entry as having an untouched status. The status of the cache entry is updated in response to receiving a request for at least a portion of the cache entry. The cache entry is cast out according to a preselected cache line replacement algorithm, and the cast out cache entry is stored in the lower level second cache according to the status of the cast out cache entry.

Another aspect of the disclosed subject matter is seen in a memory system. The memory system comprises a first-level cache, a first-level cache controller, a second-level cache, and a second-level cache controller. The first-level cache controller is adapted for identifying a received cache entry as having an untouched status, updating the status of the cache entry to accessed in response to receiving a request for at least a portion of the cache entry, and casting out the cache entry according to a preselected cache line replacement algorithm. The second-level cache controller is adapted for controlling storage of the cast out cache entry in the second cache according to the status of the cast out cache entry.

Another aspect of the disclosed subject matter is seen in a microprocessor. The microprocessor comprises a core, a first-level cache, a first-level cache controller, a second-level cache, and a second-level cache controller. The first-level cache controller is adapted for identifying a received cache entry as having an untouched status, updating the status of the cache entry in response to receiving a request for at least a portion of the cache entry, and casting out the cache entry according to a preselected cache line replacement algorithm. The second-level cache controller is adapted for controlling storage of the cast out cache entry in the second cache according to the status of the cast out cache entry.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
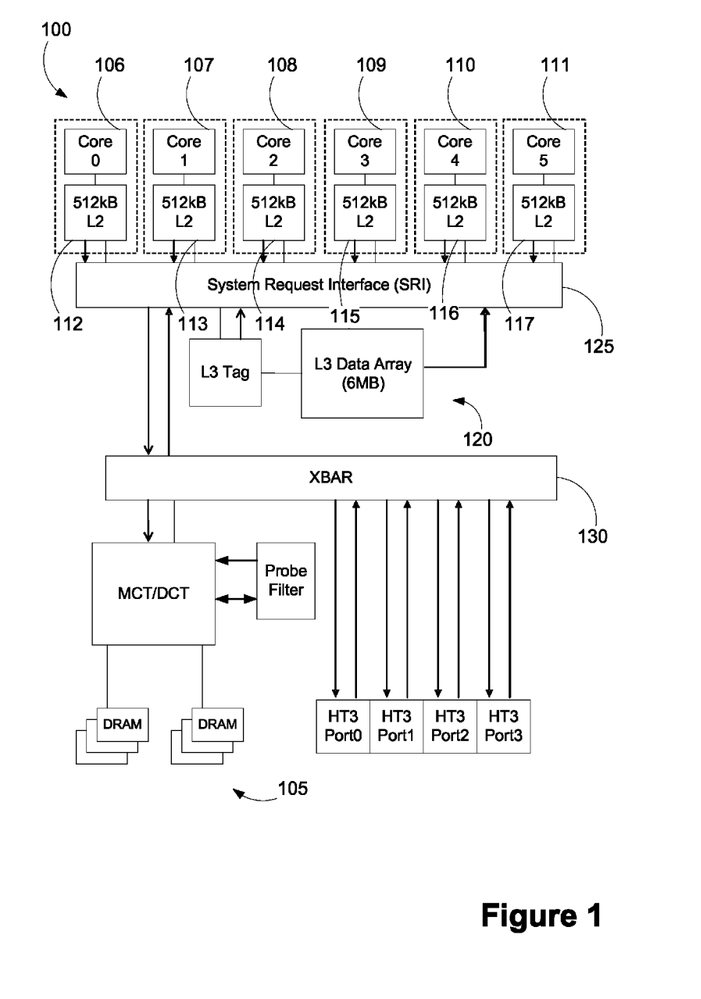
FIG. 1 is a block level diagram of a microprocessor having a plurality of cores with a plurality of non-shared L2 caches and a shared L3 cache.

Referring now to the drawings wherein like reference numbers correspond to similar components throughout the several views and, specifically, referring to FIG. 1, the disclosed subject matter shall be described in the context of an microprocessor 100 coupled with an external memory 105. Those skilled in the art will recognize that a computer system may be constructed from these and other components. However, to avoid obfuscating the instant invention only those components useful to an understanding of the present invention are included.

FIG. 1 shows a memory hierarchy for a typical multiprocessor system consisting of a plurality of cores 106-111. Each core has a dedicated, private L2 processor cache 112-117. Those skilled in the art will appreciate that while the illustrative embodiment is depicted with six cores 106-111 and six L2 caches 112-117, more or fewer cores and caches may be employed without departing from the spirit and scope of the instant invention.

In the illustrated exemplary embodiment, an L3 cache 120 is shared by all the processor cores 106-111 via a System Request Interface 125. In the illustrated embodiment, the L3 cache is a Last Level Cache (LLC), however, those skilled in the art will appreciate that additional levels of cache may be employed without departing from the spirit and scope of the instant invention.

Figure 2:
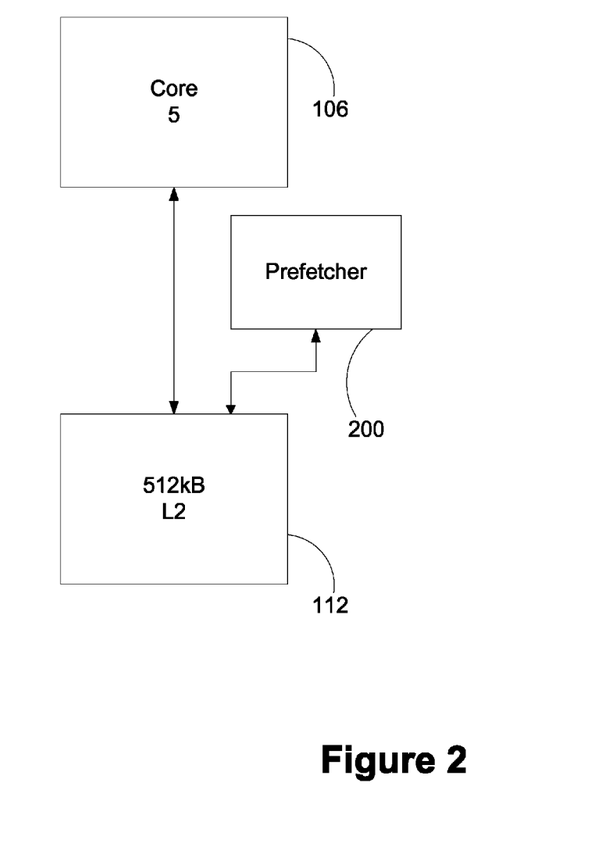
FIG. 2 is a simplified block diagram illustrating the relationship between one of the cores, one of the L2 caches and a prefetcher that is part of the microprocessor of FIG. 1.

Each of the cores 106-111 has the ability to store software or executable code and data lines in its corresponding L2 cache 112-117. A prefetcher unit 200 (see FIG. 2) associated with each processor core 106-111 also has the ability to retrieve data and code from external memory 105 via the transfer bar (XBAR) 130 before it is actually needed for execution by the cores 106-111 and store the prefetched code and data in the L2 cache 112-117. A variety of well-known methodologies may be used to determine which code and data should be prefetched from the memory 105; however, those skilled in the art will appreciate that any prefetching methodology may be employed without departing from the spirit and scope of the instant invention.

To ensure efficient operation of the L2 cache, it is generally desirable to fill the L2 cache with data and code that is most likely to be used by the cores 106-111 in the immediate future. One such methodology involves replacing data or code stored in the cache once it has been stored in the cache for a preselected period of time without being accessed. This process is generally known as "aging out." When a line within the L2 cache 112-117 ages out, it is removed or "cast out" of the L2 cache 112-117 as part of a transaction. The cast out lines may be referred to as "victim" lines, and when cast out, they are normally not entirely discarded, but are often installed in the next level cache, such as the L3 cache 120 in the instant embodiment.

Memory accesses from a processor can generally be divided into two categories, those that arise from execution of the program (demand accesses) and those generated by a prefetcher (prefetches). In one embodiment of the instant apparatus, a distinction is made between prefetches and demand accesses when a line of memory is first installed in the processor cache. For example, prefetched lines of memory are installed in the L2 cache 112-117 with an "untouched" attribute, status or flag. As used herein, the phrase untouched attribute, status, or flag is intended to mean an indication that a portion of memory, such as a cache block or line, was prefetched and has not yet been accessed or touched by any of the processor cores 106-111. If the processor core 106-111 subsequently accesses the line in its L2 cache 112-117, the untouched attribute is cleared, which indicates that the line has been accessed by the processor core 106-111. However, when a line ages out of the L2 cache 112-117, the untouched attribute is exported or delivered along with the victim line being cast out of the L2 cache 112-117 via the SRI 125. The untouched attribute can be used to control the install policy used by the L3 cache 120 so as to avoid cache pollution in the L3 cache 120. For example, victim lines that have the untouched attribute set may not be installed in the L3 cache 120 at all, or they may be installed in a location in the L3 cache 120 that has been identified as a Least Recently Used (LRU) slot. In the illustrated embodiment, the LRU slot is the next cache line to be cast out from the L3 cache in response to a subsequent storage operation to the L3 cache. In this embodiment, the cache line that has been discarded from the L2 cache 112-117 is at least temporarily retained in the L3 cache 120 in case the core 106-111 decides to access a memory location that is present in the discarded L2 cache line.

Figure 3:
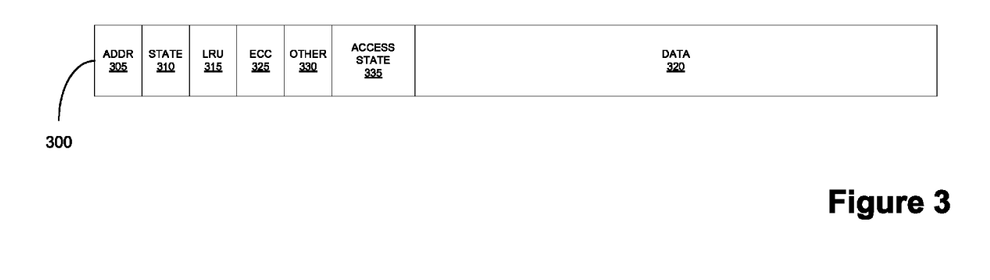
FIG. 3 is a stylistic representation of a cache line entries in a cache associated with the microprocessor of FIG. 1.

As shown in FIG. 3, each line 300 in the L2 cache 112-117 typically contains an address (ADDR) tag 305, access state field 310, LRU field 315 and data 320. It may optionally contain ECC code 325 and other attributes 330. The untouched attribute 335 can be stored in a variety of locations within the L2 cache 112-117. For example, the untouched attribute 335 can be stored as a standalone attribute, as shown in FIG. 3, or it may be encoded in the access state field 310.

During the operation of prior microprocessors, when code is prefetched and stored into a cache, its state field is typically identified as a Share (S) state. In one embodiment of the instant invention, the Share state could be replaced with two states, such as: 1) Share Accessed (S.Accessed); and 2) Share Untouched (S.Untouched). Thus, during the operation of one embodiment of the instant invention, when code is prefetched and stored into the cache 112-117, the access state field 310 of the prefetched cache line may be set as S.Untouched, indicating that the cache line has not yet been accessed by the core 106-111. Subsequently, as shown in the flow chart of FIG. 4, when the core 106-111 is executing code, it will send a request to the L2 cache 112-117 for a particular memory address, at block 405. If that memory address has been prefetched into the L2 cache 112-117, the L2 cache 112-117 will detect a "hit" on the prefetched cache line based on the ADDR field 305, at block 410. A "miss" in the L2 cache will be delivered to the L3 cache 120 to determine if the requested memory address is present therein, at block 412. Assuming a hit in the L2 cache 112-117, then at block 415, the L2 cache 112-117 will inspect the access state field 310, and if the cache line is identified as S.Untouched, the cache line will be sent to the core 106-111 and the cache line in the L2 cache 112-117 will be updated so that the access state field 310 now contains an S.Accessed status, indicating that it has been accessed by the core 106-111. Alternatively, if the cache line is identified as S.Accessed, then at block 425 the cache line will be sent to the core 106-111 and the cache line in the L2 cache 112-117 will not be updated, as its status has already previously been set to to S.Accessed.

Figure 5:
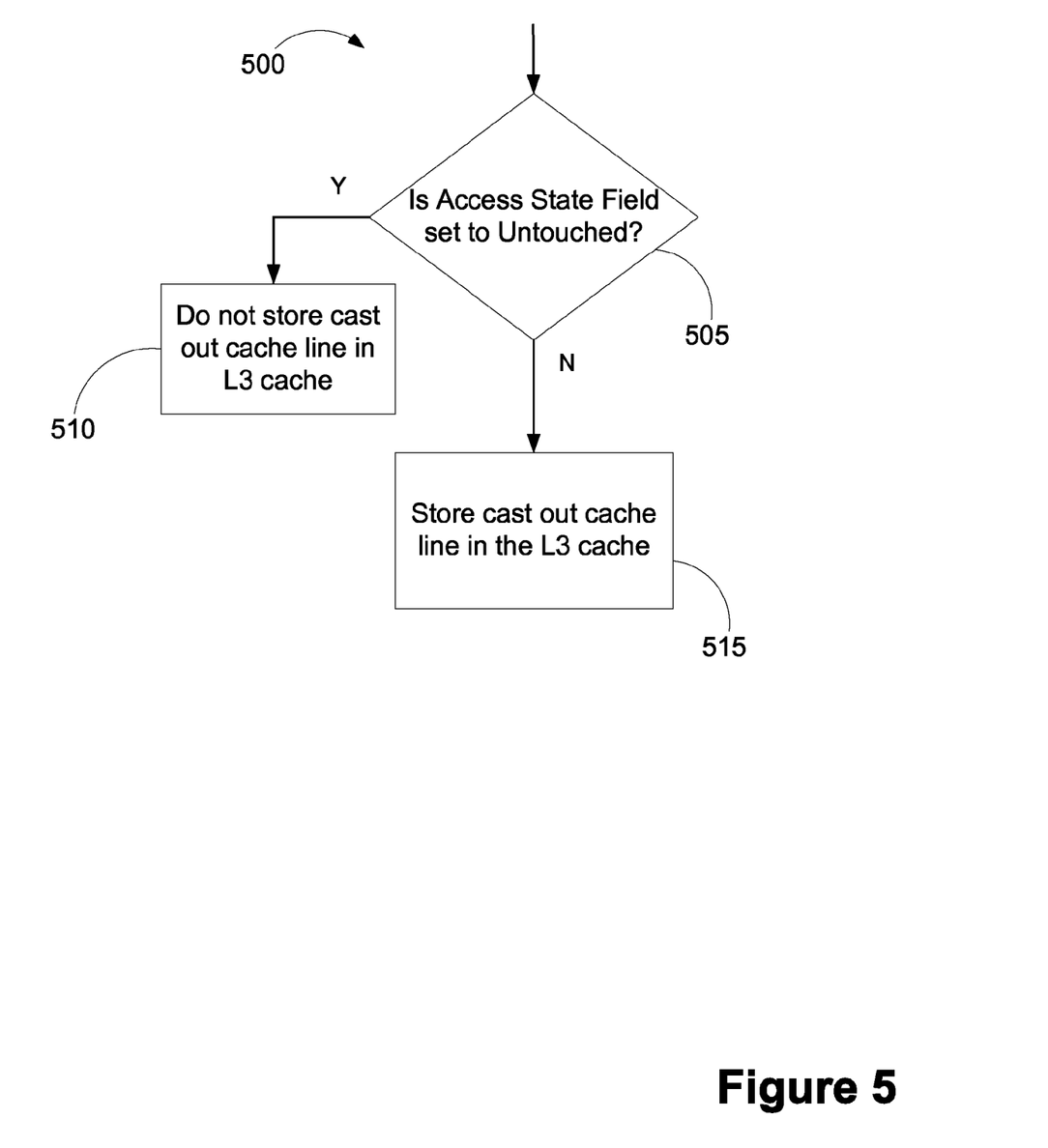
FIG. 5 is a stylistic representation of a flow chart depicting operation of the L3 cache associated with the microprocessor of FIG. 1.

FIG. 5 illustrates a flow chart representation of the operation of the L3 cache 120 in response to receiving a line of code from the L2 cache 112-117 during a cast out operation where a line of code has aged out. In one embodiment of the instant invention, the L3 cache 120 can receive two types of relevant cast outs from the L2 cache 112-117. That is, the L3 cache 120 may be configured to respond differently, depending on whether the access state field 310 is set to S.Accessed or S.Untouched. The process begins at decision block 505 with the L3 cache 120 inspecting the access state field 310 of the cast out cache line 300. If the access state field 310 is set to S.Untouched, then control is passed to block 510 where the L3 cache 120 recognizes that the cast out cache line 300 was never accessed by the core 106-111. Accordingly, in the illustrated embodiment, the untouched, cast out cache line 300 is discarded and not stored in the L3 cache 120 in block 510.

On the other hand, if the access state field 310 of the cast out cache line 300 is set to S.Accessed, then control is passed to block 515 where the L3 cache 120 recognizes that the cast out cache line 300 was accessed by the core 106-111. Accordingly, in the illustrated embodiment, the accessed, cast out cache line 300 is stored in the L3 cache 120 where it may be quickly and efficiently retrieved if needed.

Figure 6:
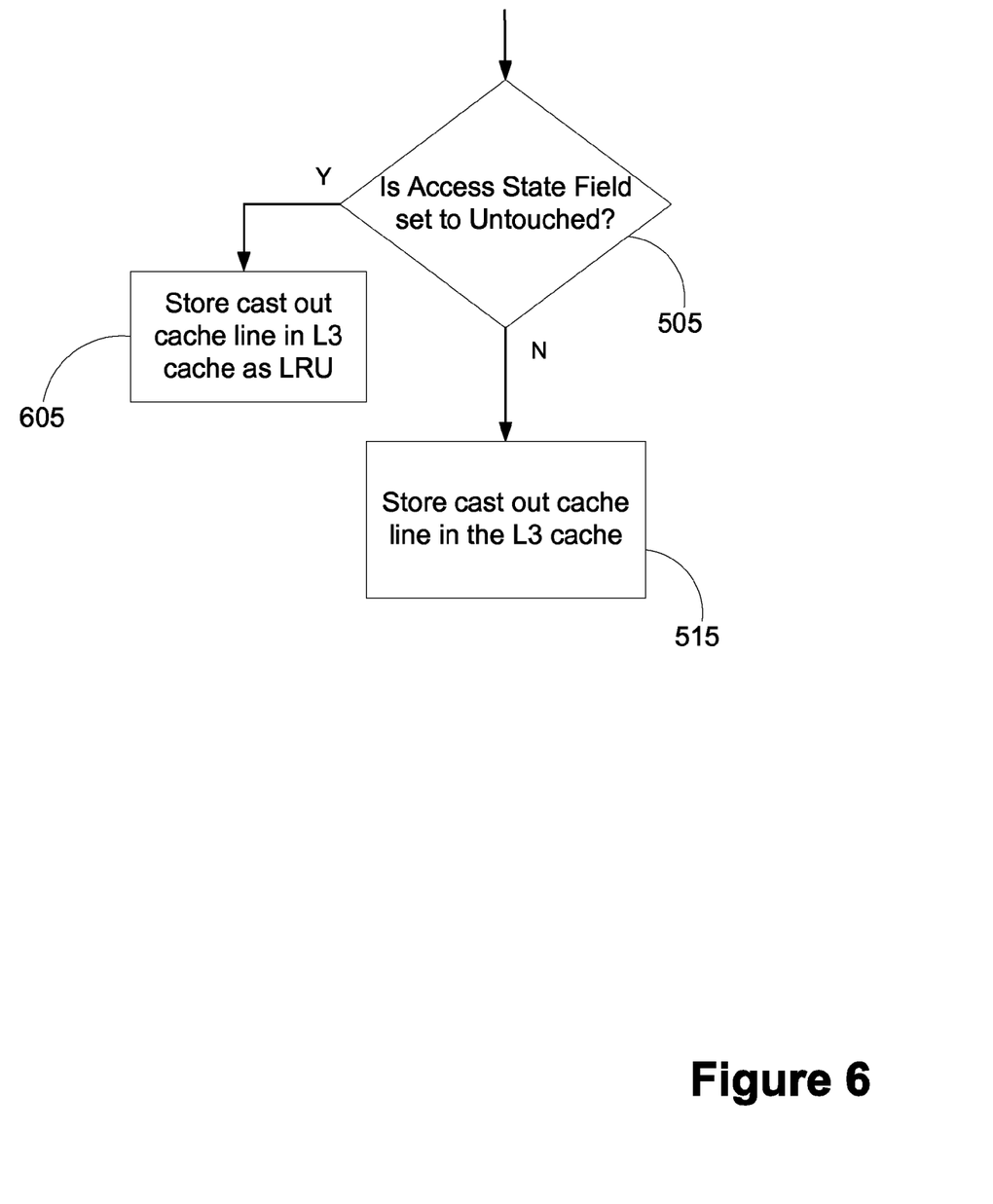
FIG. 6 is a stylistic representation of an alternative embodiment of a flow chart depicting operation of the L3 cache associated with the microprocessor of FIG. 1.

An alternative embodiment of the instant invention is shown in a flow chart representation of the operation of the L3 cache 120 in FIG. 6. In this embodiment of the invention, the operation of the L3 cache 120 is altered to respond differently in the event that the access state field 310 of the cast out cache line 300 is set to S.Untouched, as shown at block 605. In particular, the L3 cache 120 does not immediately discard the cast out cache line 300, but rather, stores the cast out cache line 300 in the L3 cache 120 despite its access state field 310 having an S.Untouched status. Instead, the L3 cache 120 stores the cast out cache line 300 and identifies it as the LRU entry. In this manner, the L3 cache 120 temporarily stores the untouched, cast out cache line until receiving another cache line, such as a subsequent cast out line from the L2 cache 112-117. That is, because the untouched cache line 300 has been identified as the LRU entry, it has the lowest priority of all the cache lines in the L3 cache 120 and will be the next cache line replaced.

The instant invention may also find application to instances where data, as opposed to code, is retrieved from memory and placed in the L2 cache 112-117. During the operation of prior microprocessors, when data is fetched and stored into a cache, its state field is typically identified as an Exclusive (E) state. In one embodiment of the instant invention, the Exclusive state could be replaced with two states, such as: 1) Exclusive Accessed (E.Accessed); and 2) Exclusive Untouched (E.Untouched). Thus, during the operation of one embodiment of the instant invention, when data is fetched and stored into the L2 cache 112-117, the access state field 310 of the prefetched cache line may be set as E.Untouched, indicating that the cache line has not yet been accessed by the core 106-111. Subsequently, during subsequent operations of the L2 and L3 caches 112-117 and 120, the E.Untouched state field will operate in a substantially identical manner as the S.Untouched state field, and the E.Accessed state field will operate in a substantially identical manner as the S.Accessed state field, as described in FIGS. 4-6.

Figure 4:
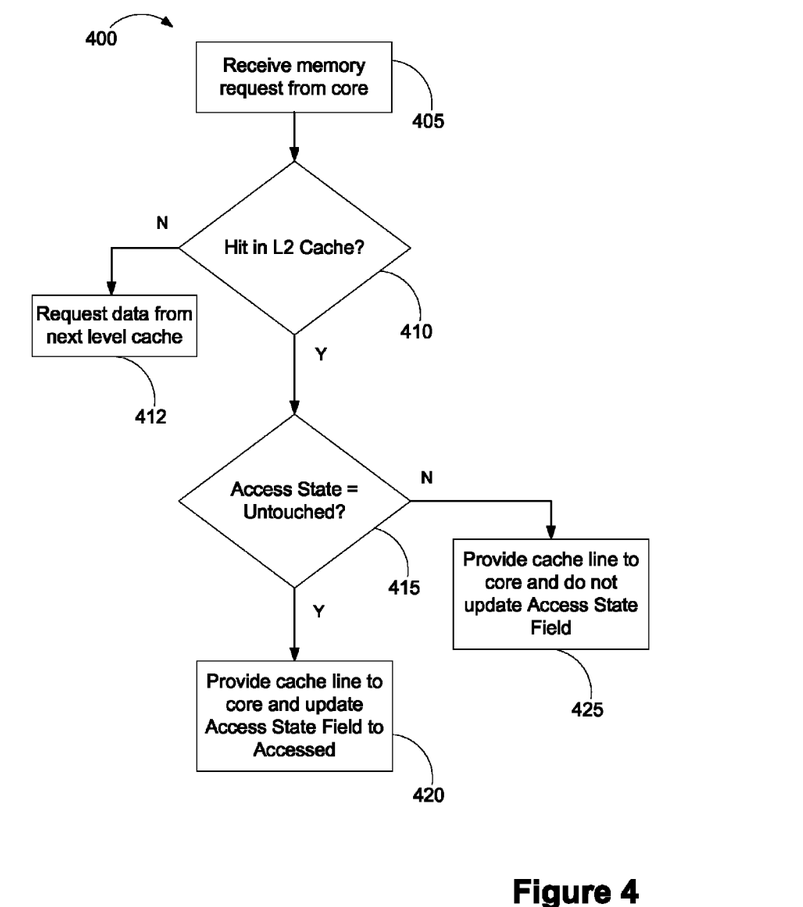
FIG. 4 is a stylistic representation of a flow chart depicting operation of the L2 cache associated with the microprocessor of FIG. 1.

Those skilled in the art will appreciate that the functionality described in conjunction with FIGS. 4-6 may be provided in various ways without departing from the spirit and scope of the instant invention. For example, the functionality may be provided through hardware, software, firmware or a combination thereof. Moreover, controllers for the L2 and L3 caches that are capable of providing the functionality described in conjunction with FIGS. 4-6 may be separate stand-alone devices, may be a single device capable of controlling both the L2 and L3 caches, or may be part of a larger device with many more capabilities than those identified with respect to FIGS. 4-6.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units, RAM, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer, processor or controller, which may then control, in whole or part, the operation of a semiconductor manufacturing facility (or fab) to create semiconductor products and devices. For example, in one embodiment, silicon wafers containing the instant invention may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method for controlling a first and second cache, comprising:
   receiving a cache entry in the first cache;
   identifying the received cache entry as having an untouched status;
   updating the untouched status of the cache entry to accessed in response to receiving a request for at least a portion of the cache entry;
   casting out the cache entry according to a preselected cache line replacement algorithm; and
   controlling storage of the cast out cache entry in the second cache according to the status of the cast out cache entry.

2. A method, as set forth in claim 1, wherein controlling storage of the cast out cache entry further comprises storing the cast out cache entry in the second cache in response to the cast out cache entry having an accessed status.

3. A method, as set forth in claim 1, wherein controlling storage of the cast out cache entry further comprises preventing the cast out cache entry from being stored in the second cache in response to the cast out cache entry having an untouched status.

4. A method, as set forth in claim 1, wherein controlling storage of the cast out cache entry further comprises storing the cast out cache entry in the second cache and identifying the cast out cache entry as being the least recently used entry in the second cache in response to the cast out cache entry having an untouched status.

5. A memory system, comprising:
   a first-level cache;
   a second-level cache;
   a first-level cache controller adapted for identifying a received cache entry as having an untouched status, updating the untouched status of the cache entry to accessed in response to receiving a request for at least a portion of the cache entry, and casting out the cache entry according to a preselected cache line replacement algorithm; and
   a second-level cache controller for controlling storage of the cast out cache entry in the second cache according to the status of the cast out cache entry.

6. A memory system, as set forth in claim 5, wherein the second-level cache controller controls storage of the cast out cache entry by storing the cast out cache entry in the second cache in response to the cast out cache entry having an accessed status.

7. A memory system, as set forth in claim 5, wherein the second-level cache controller controls storage of the cast out cache entry by preventing the cast out cache entry from being stored in the second cache in response to the cast out cache entry having an untouched status.

8. A memory system, as set forth in claim 5, wherein the second-level cache controller controls storage of the cast out cache entry by storing the cast out cache entry in the second cache and identifying the cast out cache entry as being the least recently used entry in the second cache in response to the cast out cache entry having an untouched status.

9. A memory system, as set forth in claim 5, wherein the first-level cache controller is adapted to deliver the status of the cast out cache entry to the second-level cache-controller in response to the cache entry being cast out of the first-level cache.

10. A microprocessor, comprising:
    a core;
    a first-level cache;
    a second-level cache;
    a first-level cache controller adapted for identifying a received cache entry as having an untouched status, updating the status of the cache entry to accessed in response to receiving a request for at least a portion of the cache entry from the core, and casting out the cache entry according to a preselected cache line replacement algorithm; and
    a second-level cache controller for controlling storage of the cast out cache entry in the second cache according to the status of the cast out cache entry.

11. A microprocessor, as set forth in claim 10, wherein the second-level cache controller controls storage of the cast out cache entry by storing the cast out cache entry in the second cache in response to the cast out cache entry having an accessed status.

12. A microprocessor, as set forth in claim 10, wherein the second-level cache controller controls storage of the cast out cache entry by preventing the cast out cache entry from being stored in the second cache in response to the cast out cache entry having an untouched status.

13. A microprocessor, as set forth in claim 10, wherein the second-level cache controller controls storage of the cast out cache entry by storing the cast out cache entry in the second cache and identifying the cast out cache entry as being the least recently used entry in the second cache in response to the cast out cache entry having an untouched status.

14. A microprocessor, as set forth in claim 10, wherein the first-level cache controller is adapted to deliver the status of the cast out cache entry to the second-level cache-controller in response to the cache entry being cast out of the first-level cache.

15. A computer readable storage device encoded with data that, when implemented in a manufacturing facility, adapts the manufacturing facility to create a memory system, comprising:
    a first-level cache;
    a second-level cache;
    a first-level cache controller adapted for identifying a received cache entry as having an untouched status, updating the untouched status of the cache entry to accessed in response to receiving a request for at least a portion of the cache entry, and casting out the cache entry according to a preselected cache line replacement algorithm; and
    a second-level cache controller for controlling storage of the cast out cache entry in the second cache according to the status of the cast out cache entry.

16. A computer readable storage device, as set forth in claim 15, wherein the second-level cache controller controls storage of the cast out cache entry by storing the cast out cache entry in the second cache in response to the cast out cache entry having an accessed status.

17. A computer readable storage device, as set forth in claim 15, wherein the second-level cache controller controls storage of the cast out cache entry by preventing the cast out cache entry from being stored in the second cache in response to the cast out cache entry having an untouched status.

18. A computer readable storage device, as set forth in claim 15, wherein the second-level cache controller controls storage of the cast out cache entry by storing the cast out cache entry in the second cache and identifying the cast out cache entry as being the least recently used entry in the second cache in response to the cast out cache entry having an untouched status.

19. A computer readable storage device, as set forth in claim 15, wherein the first-level cache controller is adapted to deliver the status of the cast out cache entry to the second-level cache-controller in response to the cache entry being cast out of the first-level cache.

* * * * *